(12) United States Patent
Otsuki et al.

(10) Patent No.: US 11,548,496 B2
(45) Date of Patent: Jan. 10, 2023

(54) VEHICLE

(71) Applicant: HONDA MOTOR CO., LTD., Tokyo (JP)

(72) Inventors: Yuto Otsuki, Saitama (JP); Satoshi Ando, Saitama (JP); Keiichi Ohiso, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 48 days.

(21) Appl. No.: 17/193,543

(22) Filed: Mar. 5, 2021

(65) Prior Publication Data

US 2021/0276536 A1     Sep. 9, 2021

(30) Foreign Application Priority Data

Mar. 6, 2020 (JP) .............................. JP2020-039007

(51) Int. Cl.
*B60W 20/15* (2016.01)
*B60W 10/08* (2006.01)
*B60W 10/06* (2006.01)

(52) U.S. Cl.
CPC ............ *B60W 20/15* (2016.01); *B60W 10/06* (2013.01); *B60W 10/08* (2013.01); *B60W 2520/10* (2013.01)

(58) Field of Classification Search
CPC ...... B60W 20/15; B60W 10/06; B60W 10/08; B60W 2520/10; B60W 2540/10;

(Continued)

(56) References Cited

U.S. PATENT DOCUMENTS 6,041,877 A * 3/2000 Yamada ................. B60K 6/543
                                                                180/242
6,295,487 B1 * 9/2001 Ono ................. B60W 30/18172
                                                                701/52

(Continued)

FOREIGN PATENT DOCUMENTS

JP        H11-332021 A      11/1999
JP        2007-313982 A     12/2007

(Continued)

OTHER PUBLICATIONS

Oct. 19, 2021, Japanese Office Action issued for related JP Application No. 2020-039007.

*Primary Examiner* — Sizo B Vilakazi
*Assistant Examiner* — Brian R Kirby
(74) *Attorney, Agent, or Firm* — Paratus Law Group, PLLC

(57) ABSTRACT

A vehicle includes a main drive unit, a sub drive unit, and a control unit. The control unit includes a driving force distribution ratio setting unit and is configured to control the main drive unit and the sub drive unit. A drive mode of the main drive unit includes an electric power drive mode and an engine drive mode. The driving force distribution ratio setting unit is configured to set the driving force distribution ratio based on a vehicle speed, a required driving force, and the drive mode. When the drive mode is the engine drive mode, the driving force distribution ratio setting unit is configured to set the driving force distribution ratio so that a distribution ratio of the main driving force is 90% or more.

3 Claims, 8 Drawing Sheets

(58) Field of Classification Search
CPC ........... B60W 2720/403; B60W 20/10; B60W 30/02; Y02T 10/62; Y02T 10/72; B60K 6/448; B60K 6/48; B60K 6/52; B60K 17/356; B60K 17/34
USPC .......................................................... 701/22
See application file for complete search history.

(56) References Cited

U.S. PATENT DOCUMENTS

| | | | | |
|---|---|---|---|---|
| 6,549,840 | B1* | 4/2003 | Mikami | B60K 6/365 |
| | | | | 903/910 |
| 7,104,347 | B2* | 9/2006 | Severinsky | F02B 37/16 |
| | | | | 180/65.23 |
| 7,240,748 | B2* | 7/2007 | Kira | B60K 6/52 |
| | | | | 180/65.6 |
| 8,068,946 | B2* | 11/2011 | Amamiya | B60L 50/62 |
| | | | | 701/22 |
| 9,387,847 | B2* | 7/2016 | Noguchi | B60L 58/12 |
| 2002/0056584 | A1* | 5/2002 | Nakasako | B60W 20/10 |
| | | | | 903/917 |
| 2004/0104059 | A1* | 6/2004 | Yamamoto | B60K 6/52 |
| | | | | 180/65.25 |
| 2004/0147366 | A1* | 7/2004 | Aoki | B60K 6/44 |
| | | | | 477/6 |
| 2005/0101433 | A1* | 5/2005 | Joe | B60K 6/365 |
| | | | | 903/910 |
| 2006/0048982 | A1* | 3/2006 | Yamamoto | B60W 10/06 |
| | | | | 180/65.225 |
| 2007/0227790 | A1* | 10/2007 | Tanishima | B60L 50/16 |
| | | | | 180/65.245 |
| 2009/0024262 | A1* | 1/2009 | Amamiya | B60W 50/082 |
| | | | | 903/902 |
| 2009/0088914 | A1 | 4/2009 | Mizutani et al. | |
| 2014/0114520 | A1 | 4/2014 | Andou et al. | |
| 2015/0059688 | A1* | 3/2015 | Kojima | F02D 37/02 |
| | | | | 123/305 |
| 2017/0008509 | A1* | 1/2017 | Sato | B60W 10/26 |
| 2017/0158044 | A1 | 6/2017 | Sakai et al. | |
| 2017/0259809 | A1* | 9/2017 | Sakamoto | B60W 40/105 |

FOREIGN PATENT DOCUMENTS

| | | |
|---|---|---|
| JP | 2014-080159 A | 5/2014 |
| JP | 2017-105243 A | 6/2017 |

* cited by examiner

<ENGINE RUNNING (ENGINE DRIVE MODE)>

FIG.6

| | LOW ← | | VEHICLE SPEED VP [km/h] | | | → HIGH |
|---|---|---|---|---|---|---|
| SMALL ↑ | 1.00 | 0.50 | 0.50 | 0.50 | 0.50 | 0.50 |
| | 0.98 | 0.50 | 0.50 | 0.50 | 0.50 | 0.50 |
| | 0.95 | 0.52 | 0.50 | 0.50 | 0.50 | 0.50 |
| | 0.91 | 0.55 | 0.54 | 0.50 | 0.50 | 0.50 |
| | 0.86 | 0.58 | 0.59 | 0.57 | 0.50 | 0.50 |
| | 0.85 | 0.59 | 0.60 | 0.58 | 0.50 | 0.50 |
| | 0.83 | 0.60 | 0.62 | 0.60 | 0.50 | 0.50 |
| | 0.83 | 0.60 | 0.62 | 0.60 | 0.50 | 0.50 |
| | 0.80 | 0.62 | 0.65 | 0.60 | 0.50 | 0.50 |
| | 0.80 | 0.62 | 0.65 | 0.60 | 0.50 | 0.50 |
| | 0.76 | 0.65 | 0.69 | 0.60 | 0.56 | 0.57 |
| | 0.75 | 0.65 | 0.70 | 0.61 | 0.58 | 0.59 |
| | 0.75 | 0.66 | 0.70 | 0.62 | 0.59 | 0.60 |
| | 0.74 | 0.66 | 0.70 | 0.63 | 0.60 | 0.58 |
| | 0.70 | 0.69 | 0.70 | 0.68 | 0.54 | 0.51 |
| REQUIRED DRIVING FORCE Freq [N] | 0.70 | 0.69 | 0.70 | 0.68 | 0.53 | 0.50 |
| | 0.71 | 0.70 | 0.70 | 0.70 | 0.51 | 0.50 |
| | 0.71 | 0.70 | 0.70 | 0.69 | 0.50 | 0.50 |
| | 0.71 | 0.70 | 0.70 | 0.68 | 0.50 | 0.50 |
| | 0.72 | 0.72 | 0.70 | 0.61 | 0.50 | 0.50 |
| | 0.72 | 0.72 | 0.70 | 0.60 | 0.50 | 0.50 |
| | 0.73 | 0.74 | 0.73 | 0.52 | 0.50 | 0.50 |
| | 0.73 | 0.75 | 0.74 | 0.50 | 0.50 | 0.50 |
| | 0.73 | 0.76 | 0.75 | 0.50 | 0.50 | 0.50 |
| | 0.75 | 0.78 | 0.79 | 0.50 | 0.50 | 0.58 |
| | 0.75 | 0.79 | 0.80 | 0.50 | 0.50 | 0.59 |
| | 0.75 | 0.79 | 0.80 | 0.50 | 0.50 | 0.60 |
| | 0.76 | 0.80 | 0.80 | 0.50 | 0.50 | 0.60 |
| | 0.76 | 0.80 | 0.80 | 0.50 | 0.50 | 0.60 |
| | 0.78 | 0.80 | 0.80 | 0.50 | 0.50 | 0.60 |
| | 0.80 | 0.80 | 0.80 | 0.50 | 0.50 | 0.60 |
| | 0.81 | 0.80 | 0.80 | 0.50 | 0.50 | 0.60 |
| ↓ LARGE | 0.86 | 0.90 | 0.80 | 0.50 | 0.50 | 0.60 |
| | 0.90 | 0.90 | 0.80 | 0.50 | 0.50 | 0.60 |
| | 0.80 | 0.90 | 0.80 | 0.50 | 0.50 | 0.60 |
| | 0.80 | 0.90 | 0.80 | 0.50 | 0.50 | 0.60 |

VEHICLE

CROSS-REFERENCE TO RELATED APPLICATIONS

This application is based on and claims priority under 35 USC 119 from Japanese Patent Application No. 2020-039007 filed on Mar. 6, 2020.

TECHNICAL FIELD

The present disclosure relates to a vehicle.

BACKGROUND ART

In recent years, a vehicle which drives both front wheels and rear wheels, a so-called four-wheel drive vehicle, has been known. Four-wheel drive vehicles are often used for vehicles which require higher power performance and better ability to run on bad roads.

Due to the growing environmental awareness in recent years, higher energy consumption efficiency is also required for four-wheel drive vehicles. Therefore, for example, JP-A-2017-105243 discloses a vehicle including an engine, which drives a rear wheel via a transmission, and a motor, which drives a front wheel via a clutch which can switch between an on state and an off state. The vehicle can be switched between an engine 2WD mode which drives only the engine, a motor 2WD mode which drives only the motor, and a hybrid 4WD mode which drives both the engine and the motor. By effectively utilizing the motor 2WD mode or the like as necessary, it is possible to reduce the environmental load and the fuel consumption.

SUMMARY OF INVENTION

However, in the vehicle of JP-A-2017-105243, since it is only possible to switch between the engine 2WD mode, the motor 2WD mode, and the hybrid 4WD mode, there is a limit to the improvement of energy consumption efficiency.

The present disclosure provides a vehicle capable of further improving energy consumption efficiency.

According to the present disclosure, there is provided a vehicle including a main drive unit configured to output a main driving force for driving one of a front wheel and a rear wheel, a sub drive unit configured to output a sub driving force for driving the other of the front wheel and the rear wheel, and a control unit configured to control the main drive unit and the sub drive unit, in which the main drive unit includes an internal combustion engine and at least one main drive rotary electric machine, the sub drive unit includes at least one sub drive rotary electric machine, the control unit includes a driving force distribution ratio setting unit configured to set a driving force distribution ratio between the main driving force and the sub driving force and is configured to control the main drive unit and the sub drive unit so that the main driving force and the sub driving force have the driving force distribution ratio set by the driving force distribution ratio setting unit, a drive mode of the main drive unit includes an electric power drive mode, in which a driving force of the main drive rotary electric machine is output as the main driving force, and an engine drive mode, in which a driving force of the internal combustion engine is output as the main driving force, the driving force distribution ratio setting unit is configured to set the driving force distribution ratio based on a vehicle speed of the vehicle, a required driving force of the vehicle, and the drive mode of the main drive unit, and when the drive mode of the main drive unit is the engine drive mode, the driving force distribution ratio setting unit is configured to set the driving force distribution ratio so that a distribution ratio of the main driving force is 90% or more.

According to the present disclosure, when the drive mode of the main drive unit is the engine drive mode, the driving force distribution ratio setting unit is configured to set the driving force distribution ratio so that the ratio of the main driving force is 90% or more.

Therefore, the electric power consumption due to the operation of the main drive rotary electric machine and the sub drive rotary electric machine can be reduced, and thus the energy consumption efficiency of the vehicle can be further improved.

BRIEF DESCRIPTION OF DRAWINGS

FIG. 6 is a diagram illustrating an electric power drive mode driving force distribution ratio map;

FIG. 7 is a diagram illustrating an engine drive mode driving force distribution ratio map; and FIG. 8 is a diagram illustrating a modification example of the engine drive mode driving force distribution ratio map.

DESCRIPTION OF EMBODIMENT

Hereinafter, an embodiment of a vehicle of the present disclosure will be described with reference to the accompanying drawings.

Figure 1:
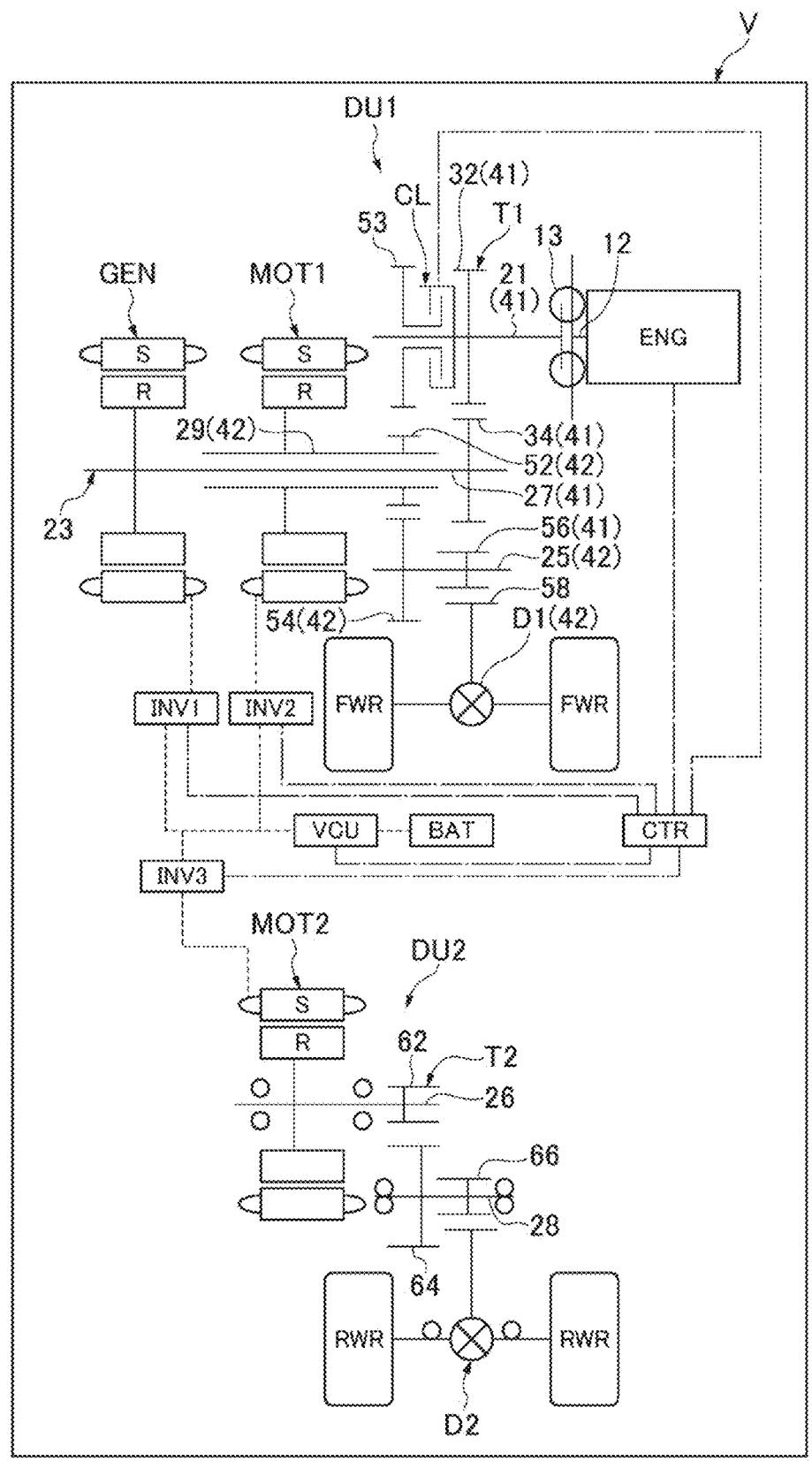
FIG. 1 is a schematic configuration diagram illustrating a schematic configuration of a vehicle according to an embodiment of the present disclosure.

As illustrated in FIG. 1, a vehicle V of the present embodiment includes a main drive unit DU1 and a sub drive unit DU2 which are mechanically independent. "Mechanically independent" means that power of one drive unit is not mechanically transmitted to the other drive unit by a propeller shaft or the like. In the present embodiment, the main drive unit DU1 outputs a main driving force to drive front wheels FWR and the sub drive unit DU2 outputs a sub driving force to drive rear wheels RWR.

The vehicle V further includes a battery BAT, a voltage control unit VCU, and a control unit CTR.

The battery BAT includes a plurality of storage cells connected in series and supplies a high voltage of, for example, 100 V to 200 V. The storage cell is, for example, a lithium ion battery or a nickel hydrogen battery.

The voltage control unit VCU boosts the output voltage output from the battery BAT as direct current. The voltage control unit VCU steps down the input voltage charged in the battery BAT. The voltage control unit VCU is, for example, a DC-DC converter.

[Configuration of Main Drive Unit]

First, the configuration of the main drive unit DU1 will be described with reference to FIG. 1.

The main drive unit DU1 includes an engine ENG, a generator GEN, a main drive motor MOT1, a first inverter INV1, a second inverter INV2, and a first transmission mechanism T1. The main drive motor MOT1 and the generator GEN are connected to the battery BAT via the voltage control unit VCU, the first inverter INV1, and the second inverter INV2. The main drive motor MOT1 and the generator GEN are capable of receiving electric power from the battery BAT and regenerating energy to the battery BAT. The dotted line in FIG. 1 indicates the electric power wiring and the alternate long and short dash line indicates the control signal line.

The first inverter INV1 converts a DC voltage into an AC voltage and supplies a three-phase current to the generator GEN. The first inverter INV1 converts the AC voltage generated by the generator GEN into the DC voltage.

The second inverter INV2 converts the DC voltage into the AC voltage and supplies a three-phase current to the main drive motor MOT1. The second inverter INV2 converts the AC voltage generated by the main drive motor MOT1 into the DC voltage when the electric vehicle is braked.

The first transmission mechanism T1 includes an input shaft 21, a generator shaft 23, a counter shaft 25, and a first differential mechanism D1 arranged in parallel with each other.

The input shaft 21 is arranged side by side coaxially with a crankshaft 12 of the engine ENG. The power of the crankshaft 12 is transmitted to the input shaft 21 via a damper 13. The input shaft 21 is provided with an output gear 32 forming a generator drive gear train, which will be described below.

On the side of the input shaft 21 opposite to the engine ENG side, an output gear 53 forming an engine power transmission gear train is provided. A hydraulic clutch CL for connecting detachably the input shaft 21 and the output gear 53 is provided between the output gear 32 and the output gear 53 on the input shaft 21.

The generator shaft 23 is a rotating shaft having a double structure including an inner peripheral shaft 27 and an outer peripheral shaft 29 arranged concentrically with respect to the inner peripheral shaft 27 on the outer peripheral side. An input gear 34 which meshes with the output gear 32 on the input shaft 21 is provided on the engine ENG side of the inner peripheral shaft 27. The output gear 32 on the input shaft 21 and the input gear 34 on the inner peripheral shaft 27 form a generator drive gear train for transmitting the power of the input shaft 21 to the inner peripheral shaft 27.

On the outer diameter side of the inner peripheral shaft 27 substantially at the center, the outer peripheral shaft 29 is installed to be relatively rotatable. The generator GEN is attached to the side of the inner peripheral shaft 27 opposite to the engine ENG side. The generator GEN is configured to include a rotor R fixed to the inner peripheral shaft 27 and a stator S fixed to a case (not illustrated) and arranged to face the outer diameter side of the rotor R.

The driving force of the input shaft 21 is transmitted to the inner peripheral shaft 27 of the generator shaft 23 via the generator driving gear train, so that the rotor R of the generator GEN rotates with the rotation of the inner peripheral shaft 27. As a result, the driving force from the input shaft 21 can be converted into electric power by the generator GEN.

An output gear 52 which meshes with an input gear 54 on the counter shaft 25, which will be described below, is provided on the engine ENG side of the outer peripheral shaft 29 and the main drive motor MOT1 is mounted on the side opposite to the engine ENG side. The main drive motor MOT1 is configured to include a rotor R fixed to the outer peripheral shaft 29 and a stator S fixed to a case (not illustrated) and arranged to face the outer diameter side of the rotor R.

The output gear 52 on the outer peripheral shaft 29 and the input gear 54 on the counter shaft 25 form a motor power transmission gear train for transmitting the power of the outer peripheral shaft 29 to the counter shaft 25. Therefore, when the outer peripheral shaft 29 is rotated by the driving force of the main drive motor MOT1, the rotation is transmitted to the counter shaft 25 via the motor power transmission gear train.

The counter shaft 25 is provided with an output gear 56 which meshes with a ring gear 58 of the first differential mechanism D1 and the input gear 54 which meshes with the output gear 53 on the input shaft 21 and the output gear 52 on the outer peripheral shaft 29 in order from the engine ENG side. The output gear 53 on the input shaft 21 and the input gear 54 on the counter shaft 25 form an engine power transmission gear train for transmitting the power of the input shaft 21 to the counter shaft 25. The output gear 56 on the counter shaft 25 and the ring gear 58 of the first differential mechanism D1 form a final gear train for transmitting the driving force of the counter shaft 25 to the first differential mechanism D1.

The driving force of the main drive motor MOT1 input to the counter shaft 25 via the motor power transmission gear train and the driving force of the engine ENG input to the counter shaft 25 via the engine power transmission gear train are output as the main driving force of the main drive unit DU1, are transmitted to the first differential mechanism D1 via the final gear train, and are transmitted from the first differential mechanism D1 to the front wheels FWR.

The first transmission mechanism T1 of the main drive unit DU1 of the embodiment includes a first transmission mechanism 41 which connects the generator GEN and the engine ENG to be capable of transmitting the power and a second transmission mechanism 42 which connects the main drive motor MOT1 and the front wheels FWR to be capable of transmitting the power. That is, the first transmission mechanism 41 is composed of the input shaft 21, the output gear 32, the input gear 34, and the inner peripheral shaft 27 and the second transmission mechanism 42 is composed of the outer peripheral shaft 29, the output gear 52, the input gear 54, the counter shaft 25, the output gear 56, and the first differential mechanism D1.

A hydraulic clutch CL is adapted to selectively switch between a state where the power transmission path between the first transmission mechanism 41 and the second transmission mechanism 42 is connected and a state where the power transmission path between the first transmission path and the second transmission path is disconnected. That is, by engaging the hydraulic clutch CL, the power transmission path between the first transmission mechanism 41 and the second transmission mechanism 42 is connected (locked up), and by releasing the hydraulic clutch CL, the power transmission path between the first transmission mechanism 41 and the second transmission mechanism 42 is disconnected. In the first transmission mechanism T1, the input gear 54 meshes with the output gear 53 on the input shaft 21 and the output gear 52 on the outer peripheral shaft 29. Therefore, when the hydraulic clutch CL is engaged, the power transmission path between the first transmission mechanism 41 and the second transmission mechanism 42 is connected and the power transmission between the first transmission mechanism 41 and the second transmission mechanism 42 becomes possible. On the other hand, when the hydraulic clutch CL is released, the output gear 53 is disengaged from the input shaft 21, so that the power transmission path between the first transmission mechanism 41 and the second transmission mechanism 42 is disconnected and the power transmission between the first transmission mechanism 41 and the second transmission mechanism 42 becomes impossible.

[Configuration of Sub Drive Unit]

The sub drive unit DU2 includes a sub drive motor MOT2, a third inverter INV3, and a second transmission mechanism T2. The sub drive motor MOT2 is connected to the battery BAT via the voltage control unit VCU and the third inverter INV3 and is capable of receiving electric power from the battery BAT and regenerating energy to the battery BAT. The dotted line in FIG. 1 indicates the electric power wiring and the alternate long and short dash line indicates the control signal line.

The second transmission mechanism T2 includes a motor output shaft 26 and an output shaft 28 arranged in parallel with each other and a second differential mechanism D2.

The sub drive unit DU2 is attached to one end of the motor output shaft 26 of the sub drive motor MOT2 so that a third drive gear 62 rotates integrally, and a third driven gear 64 which meshes with the third drive gear 62 and an output gear 66 are attached to the output shaft 28 which extends parallel to the motor output shaft 26 of the sub drive motor MOT2 to rotate integrally with the output shaft 28. Therefore, the driving force of the sub drive motor MOT2 is transmitted to the output shaft 28 via the third drive gear 62 and the third driven gear 64, and the driving force transmitted to the output shaft 28 is transmitted from the output gear 66 to the rear wheels RWR via the second differential mechanism D2. On the contrary, the driving force from the rear wheels RWR is transmitted to the sub drive motor MOT2 via the second differential mechanism D2, the output gear 66, the output shaft 28, the third driven gear 64, the third drive gear 62, and the motor output shaft 26.

[Drive Mode of Main Drive Unit]

Figure 2:
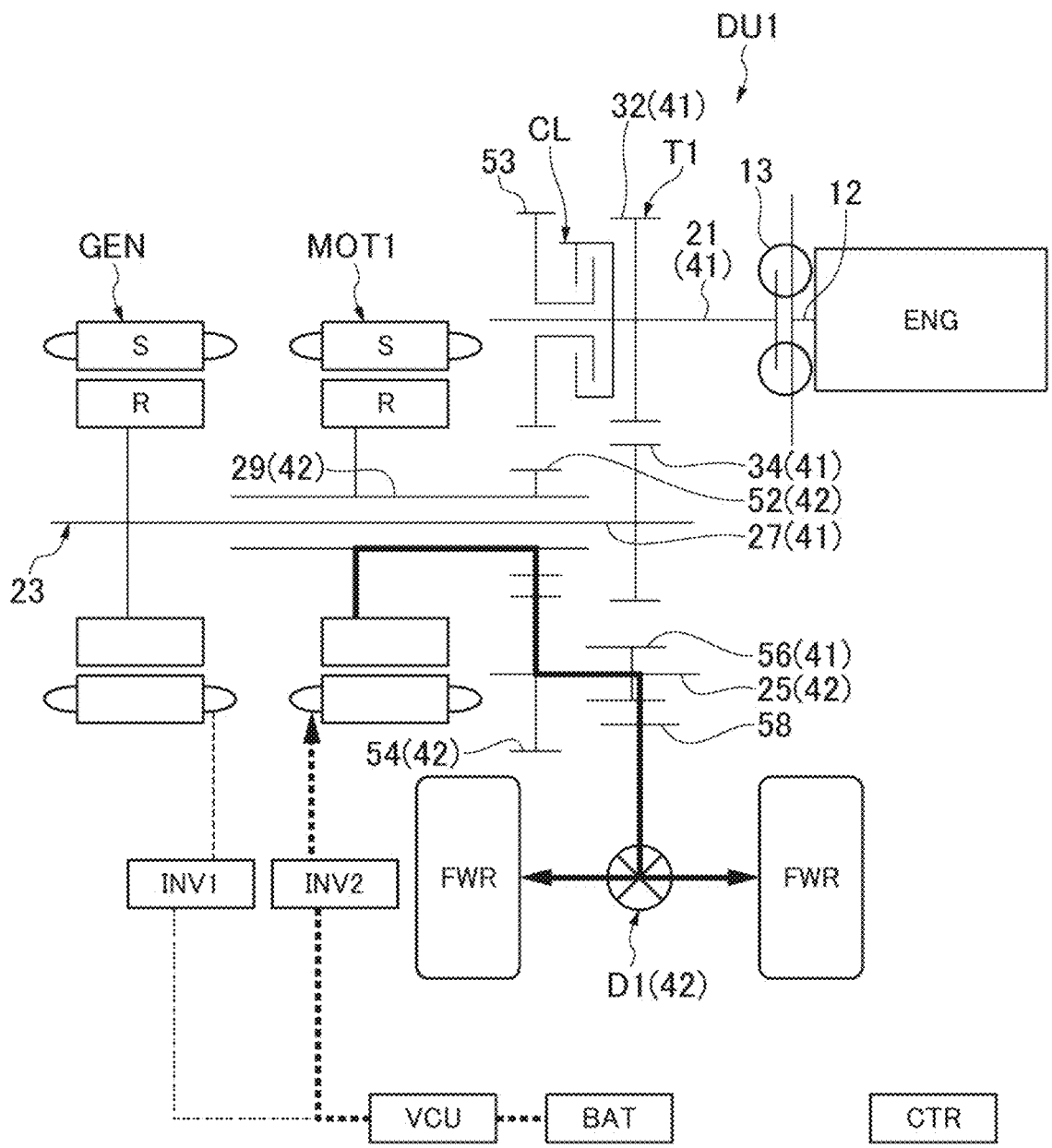
FIG. 2 is an explanatory diagram illustrating power and electric power flow when a main drive unit is in EV running (electric power drive mode)
Figure 3:
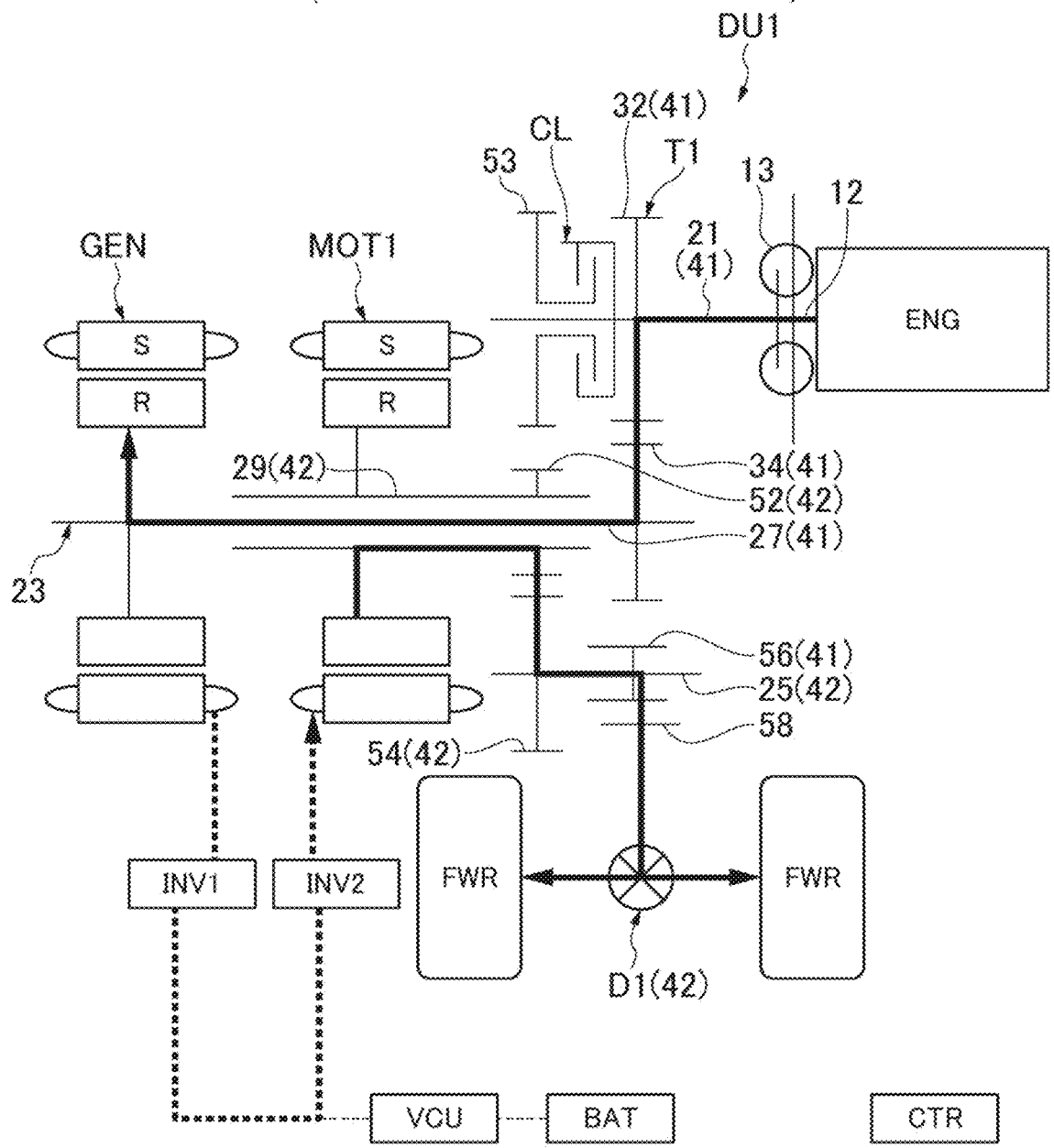
FIG. 3 is an explanatory diagram illustrating power and electric power flow when the main drive unit is in series running (electric power drive mode)
Figure 4:
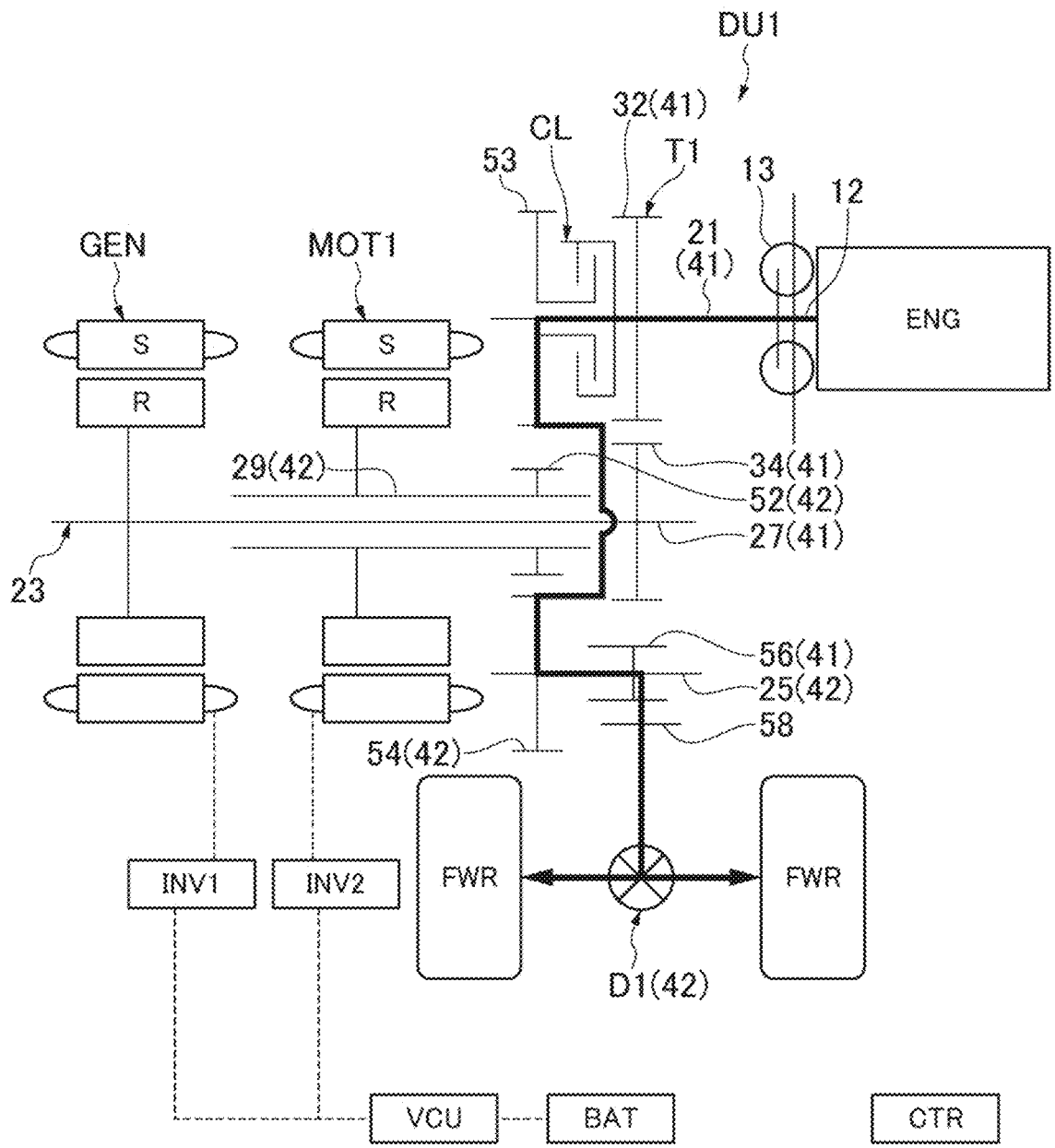
FIG. 4 is an explanatory diagram illustrating power and electric power flow when the main drive unit is in engine running (engine drive mode)

Next, the drive mode of the main drive unit DU1 will be described with reference to FIGS. 2 to 4. FIGS. 2 to 4 are simplified configurations related to the main drive unit DU1 of FIG. 1, in which the flow of electric power is indicated by a dotted arrow and the flow of power is indicated by a thick solid arrow.

The drive mode of the main drive unit DU1 includes an electric power drive mode which outputs the driving force of the main drive motor MOT1 as the main driving force and an engine drive mode which outputs the driving force of the engine ENG as the main driving force. In the electric power drive mode, the hydraulic clutch CL is released and the driving force of the main drive motor MOT1 is output as the main driving force. The electric power drive mode includes EV running and series running described below. In the engine drive mode, the hydraulic clutch CL is engaged and the driving force of the engine ENG is output as the main driving force. The engine drive mode includes engine running, which will be described below.

<EV Running (Electric Power Drive Mode)>

As illustrated in FIG. 2, in EV running, the engine ENG is put into a non-operating state and the main drive motor MOT1 is driven by the electric power supplied from the battery BAT. That is, by driving the main drive motor MOT1 with the electric power supplied from the battery BAT, the outer peripheral shaft 29 of the generator shaft 23 is rotated by the driving force of the main drive motor MOT1 and the rotation is transmitted to the counter shaft 25 via the motor power transmission gear train. The driving force of the main drive motor MOT1 transmitted as such is output as the main driving force via the final gear train and the first differential mechanism D1, and transmitted to the front wheels FWR.

As a result, EV running becomes possible.

<Series Running (Electric Power Drive Mode)>

As illustrated in FIG. 3, in the series running, the engine ENG is put into an operating state and the main drive motor MOT1 is driven by the electric power generated by the generator GEN. That is, the driving force of the engine ENG is input from the input shaft 21 to the inner peripheral shaft 27 via the generator driving gear train, so that the inner peripheral shaft 27 rotates. As a result, the rotor R of the generator GEN fixed to the inner peripheral shaft 27 rotates and electric power is generated by the generator GEN. The electric power generated by the generator GEN is supplied to the main drive motor MOT1 and the main drive motor MOT1 is driven by the electric power. The outer peripheral shaft 29 of the generator shaft 23 is rotated by the driving force of the main drive motor MOT1 and the rotation is transmitted to the counter shaft 25 via the motor power transmission gear train.

The driving force of the main drive motor MOT1 transmitted as such is output as the main driving force via the final gear train and the first differential mechanism D1, and transmitted to the front wheels FWR. As a result, so-called series running is possible in which all the driving force of the engine ENG is converted into electricity by the generator GEN to drive.

<Engine Running (Engine Drive Mode)>

As illustrated in FIG. 4, in engine running, the driving force of the engine ENG is output as the main driving force and transmitted to the front wheels FWR with the hydraulic clutch CL in the engaged state. That is, by engaging the hydraulic clutch CL, the driving force of the input shaft 21 is transmitted to the counter shaft 25 via the engine power transmission gear train, and is transmitted to the front wheels FWR via the final gear train and the first differential mechanism D1. The transmission enables engine running. Here, since the input shaft 21 and the inner peripheral shaft 27 are always connected via the generator drive gear train, the rotor R of the generator GEN rotates as the inner peripheral shaft 27 rotates. Therefore, the generator GEN can generate electric power, and thus so-called parallel running is also possible in which the main drive motor MOT1 is rotated by the generated electric power and the driving force of the engine ENG and the driving force of the main drive motor MOT1 are output as the main driving force.

[Control Unit]

The control unit CTR is a control unit which controls the entire vehicle V and controls the voltage control unit VCU, the first inverter INV1, the second inverter INV2, the third inverter INV3, the engine ENG, and the hydraulic clutch CL of the main drive unit DU1. The control unit CTR controls the input/output of the main drive unit DU1 and the sub drive unit DU2.

Subsequently, the output control of the main drive unit DU1 and the sub drive unit DU2 in the control unit CTR will be described with reference to FIGS. 5 to 7.

Figure 5:
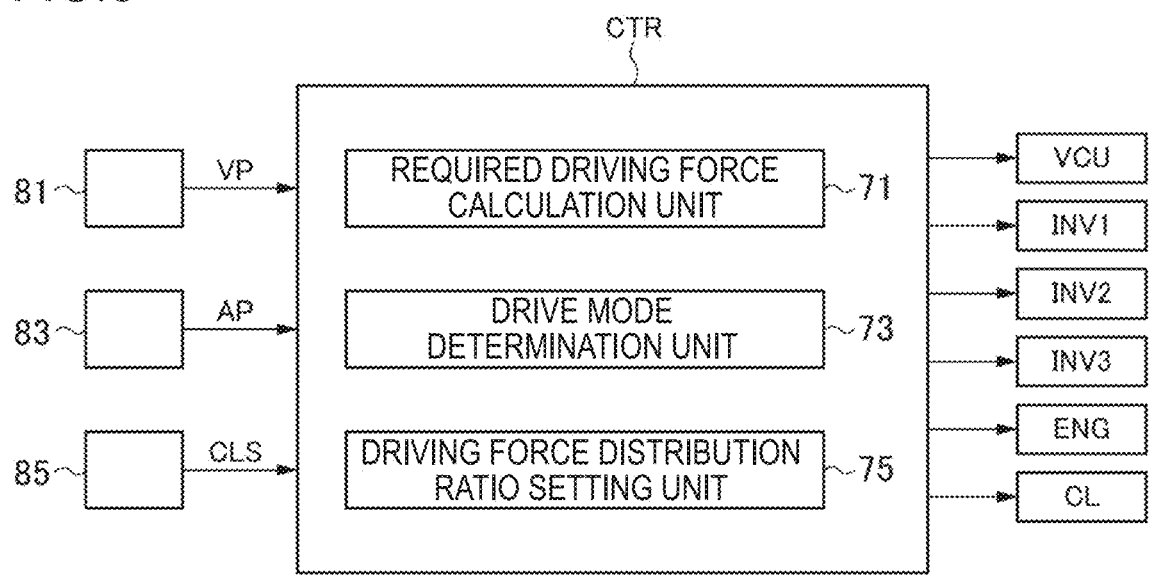
FIG. 5 is a block diagram of a control unit of the vehicle of FIG. 1.

As illustrated in FIG. 5, the control unit CTR includes a required driving force calculation unit 71 which calculates a required driving force Freq of the vehicle V, a drive mode determination unit 73 for determining whether the drive mode of the main drive unit DU1 is the electric power drive mode or the engine drive mode, and a driving force distribution ratio setting unit 75 which sets the driving force distribution ratio between the main driving force output by the main drive unit DU1 and the sub driving force output by the sub drive unit DU2.

A signal indicating a vehicle speed VP of the vehicle V, which is obtained from a vehicle speed sensor 81, a signal indicating an accelerator pedal opening AP according to the operation of the accelerator pedal by a driver of the vehicle V, which is obtained from an accelerator pedal opening sensor 83, and a signal indicating a clutch state CLS whether the hydraulic clutch CL is in the engaged state or the released state, which is obtained from a clutch sensor 85, are input.

The required driving force calculation unit 71 calculates the required driving force Freq of the vehicle V based on the vehicle speed VP obtained from the vehicle speed sensor 81 and the accelerator pedal opening AP obtained from the accelerator pedal opening sensor 83.

The drive mode determination unit 73 determines whether the drive mode of the main drive unit DU1 is the electric power drive mode or the engine drive mode based on the clutch state CLS obtained from the clutch sensor 85. Specifically, when the hydraulic clutch CL is in the engaged state, it is determined that the drive mode of the main drive unit DU1 is the engine drive mode, and when the hydraulic clutch CL is in the released state, it is determined that the drive mode of the main drive unit DU1 is the electric power drive mode.

The driving force distribution ratio setting unit 75 sets the driving force distribution ratio between the main driving force output by the main drive unit DU1 and the sub driving force output by the sub drive unit DU2 based on the vehicle speed VP obtained from the vehicle speed sensor 81, the required driving force Freq calculated by the required driving force calculation unit 71, and the drive mode of the main drive unit DU1 determined by the drive mode determination unit 73.

Figure 7:
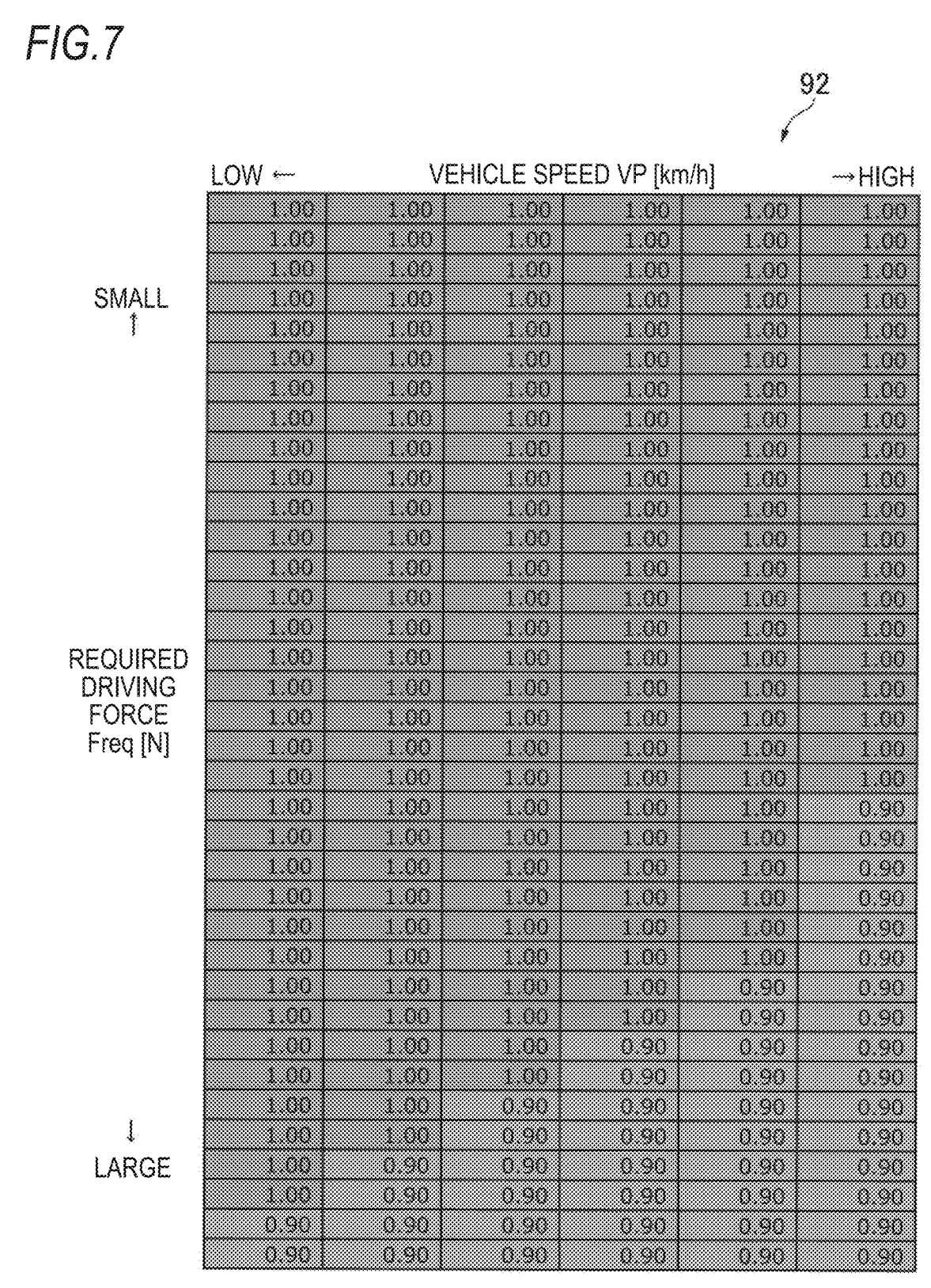

The driving force distribution ratio setting unit 75 stores an electric power drive mode driving force distribution ratio map 91 illustrated in FIG. 6 and an engine drive mode driving force distribution ratio map 92 illustrated in FIG. 7.

When the drive mode of the main drive unit DU1 determined by the drive mode determination unit 73 is the electric power drive mode, the driving force distribution ratio setting unit 75 searches the electric power drive mode driving force distribution ratio map 91 based on the vehicle speed VP obtained from the vehicle speed sensor 81 and the required driving force Freq calculated by the required driving force calculation unit 71 and sets the driving force distribution ratio between the main driving force output by the main drive unit DU1 and the sub driving force output by the sub drive unit DU2.

When the drive mode of the main drive unit DU1 determined by the drive mode determination unit 73 is the engine drive mode, the driving force distribution ratio setting unit 75 searches the engine drive mode driving force distribution ratio map 92 based on the vehicle speed VP obtained from the vehicle speed sensor 81 and the required driving force Freq calculated by the required driving force calculation unit 71 and sets the driving force distribution ratio between the main driving force output by the main drive unit DU1 and the sub driving force output by the sub drive unit DU2.

The control unit CTR controls the voltage control unit VCU, the first inverter INV1, the second inverter INV2, the third inverter INV3, the engine ENG, and the hydraulic clutch CL of the main drive unit DU1 so that the driving force distribution ratio between the main driving force output by the main drive unit DU1 and the sub driving force output by the sub drive unit DU2 becomes the driving force distribution ratio set by the driving force distribution ratio setting unit 75, so that the control unit CTR controls the outputs of the main drive unit DU1 and the sub drive unit DU2.

As illustrated in FIG. 6, in the electric power drive mode driving force distribution ratio map 91, the horizontal axis is set to the vehicle speed VP and the vertical axis is set to the required driving force Freq, and for each vehicle speed VP and each required driving force Freq, the driving force distribution ratio between the main driving force output by the main drive unit DU1 and the sub driving force output by the sub drive unit DU2 is set. The electric power drive mode driving force distribution ratio map 91 of the embodiment illustrates the distribution of the main driving force output by the main drive unit DU1 when the required driving force Freq is 1.

In FIG. 6, in the electric power drive mode driving force distribution ratio map 91, the driving force distribution ratio between the main driving force output by the main drive unit DU1 and the sub driving force output by the sub drive unit DU2 is illustrated in grayscale. In the map, the closer it is to black, the higher the distribution ratio of the main driving force and the lower the distribution ratio of the sub driving force, and the closer it is to white, the lower the distribution ratio of the main driving force and the higher the distribution ratio of the sub driving force. The part illustrated in the darkest color is the portion where the distribution of the main driving force output by the main drive unit DU1 when the required driving force Freq is 1 is set to 1.00, that is, the driving force distribution ratio is set as "main driving force:sub driving force=100:0", and thus the vehicle is driven only by the main drive unit DU1. The part illustrated in white is the portion where the distribution of the main driving force output by the main drive unit DU1 when the required driving force Freq is 1 is set to 0.50, that is, the driving force distribution ratio is set as "main driving force:sub driving force=50:50". In the electric power drive mode driving force distribution ratio map 91, for all vehicle speed VP and all required driving force Freq, when the required driving force Freq is 1, the distribution of the main driving force output by the main drive unit DU1 is set to 0.50 or more, that is, the driving force distribution ratio is set so that the distribution ratio of the main driving force becomes always 50% or more.

For example, when the vehicle speed VP is 60 km/h and the required driving force Freq is 1200 N, the distribution of the main driving force output by the main drive unit DU1 when the required driving force Freq is 1 is set to 0.70, that is, the driving force distribution ratio is set as "main driving force:sub driving force=70:30". When the vehicle speed VP is 40 km/h and the required driving force Freq is 2000 N, the distribution of the main driving force output by the main drive unit DU1 when the required driving force Freq is 1 is set to 0.80, that is, the driving force distribution ratio is set as "main driving force:sub driving force=80:20". When the vehicle speed VP is 120 km/h and the required driving force Freq is 2000 N, the distribution of the main driving force output by the main drive unit DU1 when the required driving force Freq is 1 is set to 0.60, that is, the driving force distribution ratio is set as "main driving force:sub driving force=60:40".

In the driving force distribution ratio map in the electric power driving mode 91, as the driving force distribution ratio for each vehicle speed VP and each required driving force Freq, the driving force distribution ratio that minimizes the electric power loss of the vehicle V is set based on the vehicle speed VP and the required driving force Freq.

Therefore, the driving force distribution ratio setting unit 75 sets the driving force distribution ratio to minimize the electric power loss of the vehicle V based on the vehicle speed VP of the vehicle V and the required driving force Freq of the vehicle V. Therefore, the main drive unit DU1 and sub drive unit DU2 can be controlled so that the electric power loss of the vehicle V is minimized, and thus the energy consumption efficiency of the vehicle V can be improved.

As illustrated in FIG. 7, in the engine drive mode driving force distribution ratio map 92, the horizontal axis is set to the vehicle speed VP and the vertical axis is set to the required driving force Freq. and for each vehicle speed VP and each required driving force Freq, the driving force distribution ratio between the main driving force output by the main drive unit DU1 and the sub driving force output by the sub drive unit DU2 is set.

In FIG. 7, in the engine drive mode driving force distribution ratio map 92, the driving force distribution ratio between the main driving force output by the main drive unit DU1 and the sub driving force output by the sub drive unit DU2 is illustrated in grayscale. In the map, the closer it is to black, the higher the distribution ratio of the main driving force and the lower the distribution ratio of the sub driving force, and the closer it is to white, the lower the distribution ratio of the main driving force and the higher the distribution ratio of the sub driving force. The part illustrated in the darkest color is the portion where the distribution of the main driving force output by the main drive unit DU1 when the required driving force Freq is 1 is set to 1.00, that is, the driving force distribution ratio is set as "main driving force:sub driving force=100:0", and thus the vehicle is driven only by the main drive unit DU1.

For example, when the vehicle speed VP is 60 km/h and the required driving force Freq is 1200 N, the distribution of the main driving force output by the main drive unit DU1 when the required driving force Freq is 1 is set to 1.00, that is, the driving force distribution ratio is set as "main driving force:sub driving force=100:0". When the vehicle speed VP is 40 km/h and the required driving force Freq is 2000 N, the distribution of the main driving force output by the main drive unit DU1 when the required driving force Freq is 1 is set to 1.00, that is, the driving force distribution ratio is set as "main driving force:sub driving force=100:0". When the vehicle speed VP is 120 km/h and the required driving force Freq is 2000 N, the distribution of the main driving force output by the main drive unit DU1 when the required driving force Freq is 1 is set to 0.90, that is, the driving force distribution ratio is set as "main driving force:sub driving force=90:10".

In the engine drive mode driving force distribution ratio map 92, the driving force distribution ratio for each vehicle speed VP and each required driving force Freq is set so that the distribution ratio of the main driving force is 90% or more.

Therefore, when the drive mode of the main drive unit DU1 is the engine drive mode, the driving force distribution ratio setting unit 75 sets the driving force distribution ratio so that the ratio of the main driving force is 90% or more. Therefore, the electric power consumption due to the operation of the main motor MOT1 and the sub drive motor MOT2 can be reduced, and thus the energy consumption efficiency of the vehicle V can be improved.

As illustrated in FIGS. 6 and 7, when compared with the same vehicle speed VP and the same required driving force Freq, the driving force distribution ratio set in the electric power drive mode driving force distribution ratio map 91 has the same or larger sub driving force distribution ratio than the driving force distribution ratio set in the engine drive mode driving force distribution ratio map 92. Therefore, the distribution ratio of the sub driving force, in the driving force distribution ratio when the drive mode of the main drive unit DU1 is the electric power drive mode, is the same or larger than the distribution ratio of the sub driving force, in the driving force distribution ratio when the drive mode of the main drive unit DU1 is the engine drive mode.

Therefore, the main drive unit DU1 includes the engine ENG, and in the driving force distribution ratio when the drive mode of the main drive unit DU1 is the electric power drive mode, the distribution ratio of the sub driving force is the same or larger than that of the driving force distribution ratio when the drive mode of the main drive unit DU1 is the engine drive mode. Thus, when the drive mode of the main drive unit DU1 is the electric power drive mode, the loss caused by the main drive unit DU1 can be further reduced. As a result, the energy consumption efficiency of the vehicle V can be improved.

Figure 8:
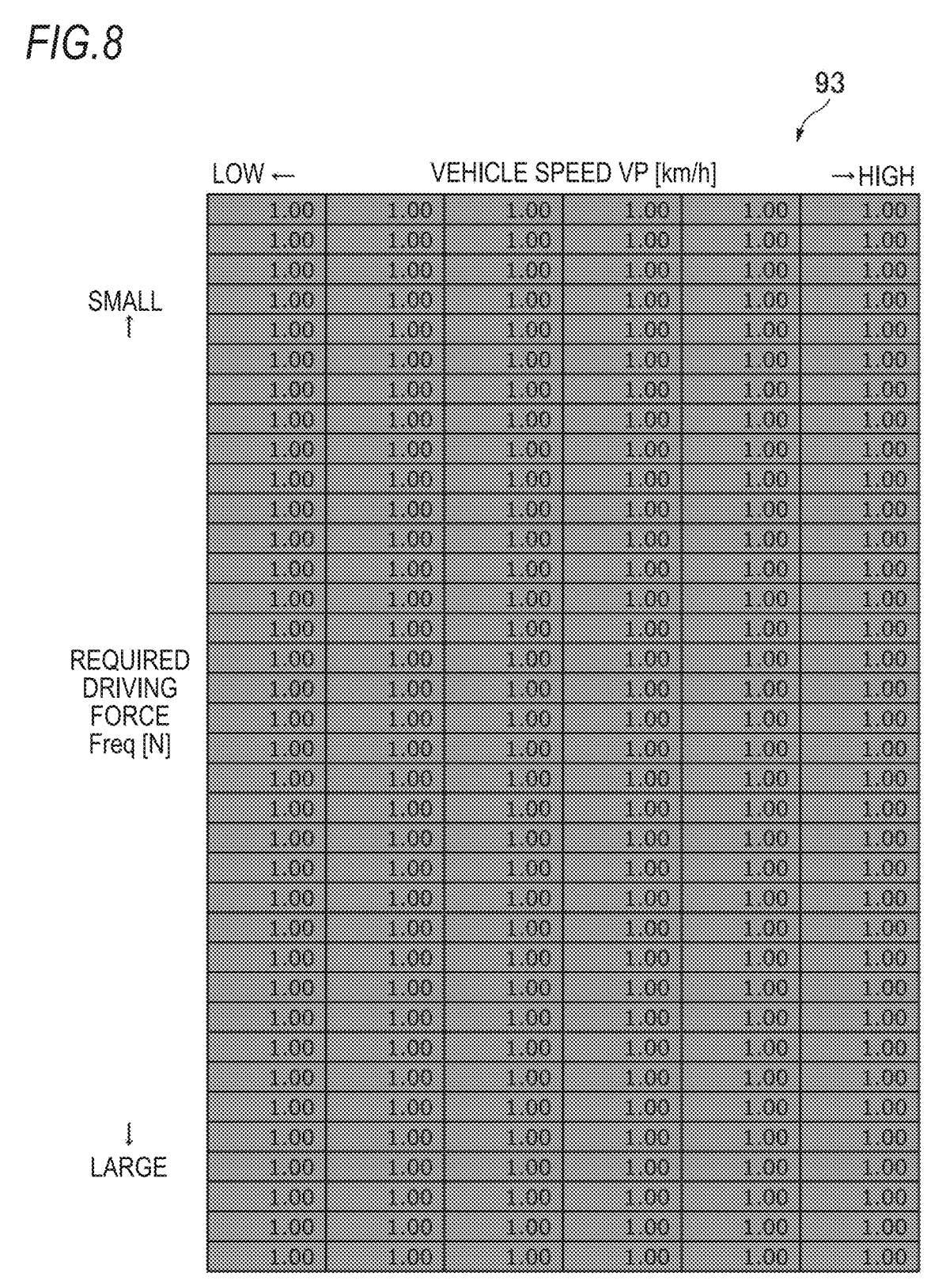

FIG. 8 illustrates an engine drive mode driving force distribution ratio map 93, which is a modification example of the engine drive mode driving force distribution ratio map 92.

The engine drive mode driving force distribution ratio map 92 may be the engine drive mode driving force distribution ratio map 93.

In the engine drive mode driving force distribution ratio map 93, for all vehicle speed VP and all required driving force Freq, when the required driving force Freq is 1, the distribution of the main driving force output by the main drive unit DU1 is set to 1.00, that is, the driving force distribution ratio is set as "main driving force:sub driving force=100:0". Therefore, the distribution ratio of the sub driving force is 0, and thus the vehicle is driven only by the main drive unit DU1.

Therefore, when the drive mode of the main drive unit DU1 is the engine drive mode, the driving force distribution ratio setting unit 75 sets the driving force distribution ratio so that the ratio of the sub driving force becomes 0. Thus, the electric power consumption due to the operation of the main drive motor MOT1 and the sub drive motor MOT2 can be reduced by simple control. As a result, the energy consumption efficiency of vehicle V can be improved by simple control.

Thus, according to the electric power drive mode driving force distribution ratio map 91 and the engine drive mode driving force distribution ratio maps 92 and 93, in the driving force distribution ratio setting unit 75, the driving force distribution ratio is set so that the distribution ratio of the main driving force is always 50% or more.

Therefore, the main drive unit DU1 includes the engine ENG and the driving force distribution ratio setting unit 75 sets the driving force distribution ratio so that the distribution ratio of the main driving force is 50% or more. Thus, the engine ENG, the main drive motor MOT1, and the sub drive motor MOT2 can be operated more efficiently. As a result, the energy consumption efficiency of the vehicle V can be improved.

Although the embodiment of the present disclosure is described above, the present disclosure is not limited to the embodiment described above and can be appropriately modified, improved, and the like.

For example, in the embodiment, the main drive unit DU1 outputs the main driving force to drive the front wheels FWR and the sub drive unit DU2 outputs the sub driving force to drive the rear wheels RWR. However, the main drive unit DU1 may output the main driving force to drive the rear wheels RWR and the sub drive unit DU2 may output the sub driving force to drive the front wheels FWR.

At least the following matters are described in the specification. The components and the like corresponding to those of the embodiment described above are shown in parentheses, but the present disclosure is not limited to these.

(1) A vehicle (vehicle V) including:
a main drive unit (main drive unit DU1) configured to output a main driving force for driving one of a front wheel (front wheel FWR) and a rear wheel (rear wheel RWR);
a sub drive unit (sub drive unit DU2) configured to output a sub driving force for driving the other of the front wheel and the rear wheel; and
a control unit (control unit CTR) configured to control outputs of the main drive unit and the sub drive unit, in which:
the main drive unit includes an internal combustion engine (engine ENG) and at least one main drive rotary electric machine (main drive motor MOT1);
the sub drive unit includes at least one sub drive rotary electric machine (sub drive motor MOT2);
the control unit includes a driving force distribution ratio setting unit (driving force distribution ratio setting unit 75) configured to set a driving force distribution ratio between the main driving force and the sub driving force and is configured to control the outputs of the main drive unit and the sub drive unit so that the main driving force and the sub driving force have the driving force distribution ratio set by the driving force distribution ratio setting unit;
a drive mode of the main drive unit includes an electric power drive mode, in which a driving force of the main drive rotary electric machine is output as the main driving force, and an engine drive mode, in which a driving force of the internal combustion engine is output as the main driving force:
the driving force distribution ratio setting unit is configured to set the driving force distribution ratio based on a vehicle speed (vehicle speed VP) of the vehicle, a required driving force (required driving force Freq) of the vehicle, and the drive mode of the main drive unit, and
when the drive mode of the main drive unit is the engine drive mode, the driving force distribution ratio setting unit is configured to set the driving force distribution ratio so that a distribution ratio of the main driving force is 90% or more.

According to (1), when the drive mode of the main drive unit is the engine drive mode, the driving force distribution ratio setting unit is configured to set the driving force distribution ratio so that the ratio of the main driving force is 90% or more. Therefore, the electric power consumption due to the operation of the main drive rotary electric machine and the sub drive rotary electric machine can be reduced, and thus the energy consumption efficiency of the vehicle can be improved.

(2) The vehicle according to (1), in which
the driving force distribution ratio setting unit is configured to determine the driving force distribution ratio so that a distribution ratio of the sub driving force becomes zero when the drive mode of the main drive unit is the engine drive mode.

According to (2), when the drive mode of the main drive unit is the engine drive mode, the driving force distribution ratio setting unit is configured to determine the driving force distribution ratio so that the ratio of the sub driving force becomes zero. Therefore, the electric power consumption due to the operation of the main drive rotary electric machine and the sub drive rotary electric machine can be reduced by simple control, and thus the energy consumption efficiency of the vehicle can be improved by simple control.

(3) The vehicle according to (1) or (2), in which
the driving force distribution ratio setting unit is configured to determine the driving force distribution ratio so that a ratio of the main driving force is 50% or more.

According to (3), the drive control unit is configured to determine the driving force distribution ratio so that the ratio of the main driving force is 50% or more. Therefore, the internal combustion engine, the main drive rotary electric machine, and the sub drive rotary electric machine can be operated more efficiently, and thus the energy consumption efficiency of the vehicle can be improved.

What is claimed is:
1. A vehicle comprising:
a main drive unit configured to output a main driving force for driving one of a front wheel and a rear wheel;
a sub drive unit configured to output a sub driving force for driving the other of the front wheel and the rear wheel; and
a control unit configured to control the main drive unit and the sub drive unit, wherein:
the main drive unit includes an internal combustion engine and at least one main drive rotary electric machine;
the sub drive unit includes at least one sub drive rotary electric machine;
the control unit includes a driving force distribution ratio setting unit configured to set a driving force distribution ratio between the main driving force and the sub driving force and is configured to control the main drive unit and the sub drive unit so that the main driving force and the sub driving force have the driving force distribution ratio set by the driving force distribution ratio setting unit;
a drive mode of the main drive unit includes an electric power drive mode, in which a driving force of the main drive rotary electric machine is output as the main driving force, and an engine drive mode, in which a driving force of the internal combustion engine is output as the main driving force;
the driving force distribution ratio setting unit stores a first driving force distribution ratio map of the electric power drive mode and a second driving force distribution ratio map of the engine drive mode;
when the drive mode of the main drive unit is the electric power drive mode, the driving force distribution ratio setting unit is configured to set the driving force distribution ratio based on a vehicle speed of the vehicle, a required driving force of the vehicle, and the first driving force distribution ratio map;
when the drive mode of the main drive unit is the engine drive mode, the driving force distribution ratio setting unit is configured to set the driving force distribution ratio based on a vehicle speed of the vehicle, a required driving force of the vehicle, and the second driving force distribution ratio map; and
when the drive mode of the main drive unit is the engine drive mode, the driving force distribution ratio setting unit is configured to set the driving force distribution ratio so that a distribution ratio of the main driving force is 90% or more based on the second driving distribution ratio map.

2. The vehicle according to claim 1, wherein
the driving force distribution ratio setting unit is configured to determine the driving force distribution ratio so that a distribution ratio of the sub driving force becomes zero when the drive mode of the main drive unit is the engine drive mode.

3. The vehicle according to claim 1, wherein
the driving force distribution ratio setting unit is configured to determine the driving force distribution ratio so that a ratio of the main driving force is 50% or more.

* * * * *